Patented Oct. 8, 1946

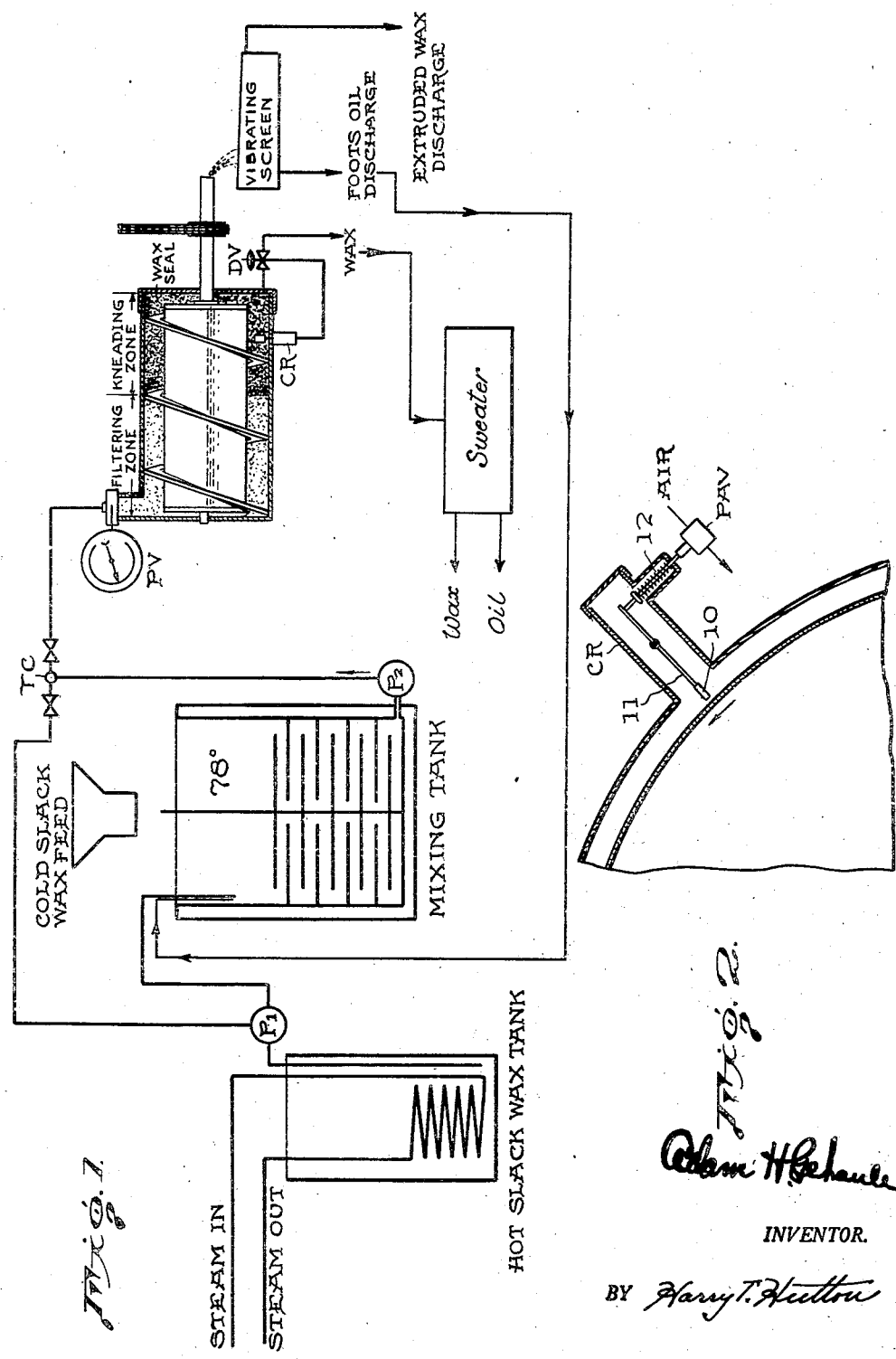

2,408,977

UNITED STATES PATENT OFFICE 2,408,977

TREATMENT OF WAX-OIL MIXTURES

Adam H. Gebauer, Short Hills, N. J., assignor to Tide Water Associated Oil Company, Bayonne, N. J., a corporation of Delaware Application December 17, 1943, Serial No. 514,619

13 Claims. (Cl. 196—19)

This invention relates to improvements in the treatment of wax-oil mixtures and in its more specific aspects to an improved process of and apparatus for removing the oily constituents of slack wax.

As is well known, slack wax is obtained in refining procedure from paraffin distillate taken in the preliminary distillation of crude oil by chilling the distillate to solidify or crystallize its wax content and thereupon forcing the chilled mixture through a filter press which removes the major portion of the oil, leaving cakes of the so-called slack wax containing, roughly, 50% wax and 50% oily constituents. This slack wax requires further de-oiling to remove the entrained oil and to regain waxes of various melting points. According to the conventional practice, such is usually effected by batch sweating, which consists in gradually raising the temperature of a batch of the slack wax and thereupon allowing the oil to separate therefrom slowly by gravity. Frequently, the sweating process is repeated thus to reduce to a minimum the amount of oil left in the wax.

While attempts have been made to replace the batch sweating process because of its admitted inefficiency, its tedious and time-consuming nature, and its requirement for extensive oven space, the practice of sweating slack wax has persisted in spite of its numerous short-comings, chiefly because of the impracticability of the mechanical methods suggested as solutions to the problem and of the high cost of refining by solvents, with the result that in general none of these appear to present a serious possibility of replacing sweating.

The present invention contemplates and provides an improved, simplified and efficient process for continuously deoiling slack wax which operates satisfactorily on all slack wax stocks which are sweatable to give wax yields at least equal to those obtained by sweating, and a degree of oil reduction equivalent to sweating. The improved process according to the invention may be used in place of the inefficient batch sweating methods, and its practice is such that it will greatly reduce the time and expense incident to the latter. Regarding saving of time, a quantity of slack wax requiring about thirty hours for deoiling by conventional sweating operations has been deoiled in considerably less than one hour by use of the method and apparatus of the present invention.

However, the improved process may be employed in supplement of the conventional sweating practice, and special benefits are secured by such combined procedure. In cases where increased slack wax deoiling capacity is required in refineries equipped with sweater ovens this increased capacity can be met advantageously by deoiling according to the present process and thereupon sweating the filtered wax product so as to relieve the sweater plant of the first and major steps in the sweating process.

The invention further provides novel and improved apparatus by which a wax-oil mixture, for example a slurry of slack wax, may be deoiled in a continuous and time-saving operation requiring the minimum of supervision, to give wax of excellent quality in relatively high yields. The apparatus of the invention is of simple, economical construction requiring a minimum of plant space and being capable of low cost operation.

These desirable objects have been achieved according to the invention by the provision of a process (and suitable apparatus useful to the process), which consists in subjecting a suitable oil-wax slurry to a combined filtering and working operation in a novel extrusion filter under conditions causing the wax particles of the slurry to filter out and agglomerate as a plastic wax product, the foots oil being forced through the filtering medium of the filter. As the oil filters out the wax is worked in the filter in such manner as to effectively further reduce its oil content, and is simultaneously propelled along the filtering medium and finally compacted to a controlled consistency, whereupon it is continuously discharged as dry scale wax substantially free of oily constituents. Preferably, the foots oil, which may contain about 2%–3% of solid wax which has passed through the filter medium, is subjected to screening, thus to regain the wax content thereof in known manner.

In the accompanying drawing there is schematically illustrated typical apparatus in accordance with the invention by which the improved process may be put into practice, in which—

Fig. 1 is a sequence or flow diagram illustrating the complete apparatus, from which the various steps of the process will also be ascertained; and Fig. 2 is a detail of a regulator by which the consistency of the substantially oil-free wax product at the outlet end of the extrusion filter is automatically adjusted for optimum results.

Referring to the drawing wherein the apparatus is designated by suitable legends, there is provided a hot slack wax tank heated by a steam coil or by other suitable means, in which cold cake slack wax from the filter press is melted. The melted slack wax is pumped by pump P—1 into a mixing tank of a type provided with interleaved stationary and rotating agitating blades, of which the rotating blades are driven by suitable power means. Cold slack wax is fed through a suitable feed hopper to the mixing tank and through the beating action of the blades is mixed with the hot slack wax to form a readily pumpable wax-oil slurry which is easily handled in the subsequent steps of the process. The mixing tank is jacketed and maintained at proper temperature by indirect contact with steam or other heating media.

Instead of mixing hot and cold slack wax as suggested, the slack wax may be heated in the hot slack wax tank and thereafter chilled in the mixing tank either by direct or indirect contact with water or equivalent temperature conditioning medium to the required working temperature, which is desirably selected for optimum filtering rates, as will hereinafter appear.

Still another procedure for preparing the slurry which is particularly suitable for continuous operation comprises adding directly to the mixing vessel cold slack wax from the presses and simultaneously agitating as with the stated blades, while heating. This treatment results in a breaking up of the slack wax slabs and release of oily constituents by reason of the combined working and heating operations, to bring the slack wax into proper condition for charging to the extrusion filter. This method is advantageous in that use of the hot slack wax tank and preliminary melting of the slack wax are eliminated.

The slurry is pumped from the bottom of the mixing tank by pump P—2, which may be of conventional gear type, and continuously forced through a supply line to an extrusion type filter. To provide for automatic temperature regulation, a temperature controller TC is inserted in the line where it functions to regulate the amount of hot slack wax added to the mixing tank, whereby only slurry at the selected temperature to which the control is adjusted is conveyed to the filter. As pressure regulation is necessary, a pressure regulating valve PV is connected in the supply line to the filter.

The extrusion type filter per se is disclosed and claimed in a copending application filed under even date, and hence will only be generally described. As more or less diagrammatically shown, the filter consists of an outer cylindrical shell carrying on its inner surface a stationary spiral blade. The outer shell is jacketed (not shown) in order to maintain the slurry undergoing filtration at proper temperature. Within the shell is disposed a rotary filter element, the wax-oil slurry being continuously fed under pressure, into the annular space between the filter shell and the inner filter element. Within the filter, major filtration appears to occur in the region of the charging end, the wax particles agglomerating and separating out as a plastic wax mass or product. Due to the relative rotation of the filter element and spiral blade, the wax is propelled in an elongated spiral path along the length of the filter element and in so doing the plastic wax is worked and kneaded as filtration thereof proceeds so as to release oil from the interstices thereof and further reduce its oil content.

A further important feature of this working or kneading operation when conducted in the described manner resides in the fact that each of the oil-bearing wax particles in passing through the device is repeatedly presented to the filtering surface where more efficient deoiling occurs than would be possible under conditions requiring the oil to pass through a thick static layer of wax to reach the filtering surface. As will be explained later herein, the rotary filter element, due to its spaced relation to the spiral blade, carries on its surface during operation of the device a relatively thin coating of wax through which oil passes readily.

The filter is provided with a discharge opening or openings for the wax product, the size of which is adjusted, either manually or automatically, to restrict free flow of the wax therethrough. Accordingly, as the separated wax is propelled by said relative motion between filter element and blade, it is progressively compacted to a consistency such that it forms a substantially solid wax seal at the discharge end of the filter of sufficient depth as to prevent channeling or blow-by of the charge, yet sufficiently shallow as to secure a maximum filtering area upstream of the seal. In addition to its kneading action, the stationary spiral blade functions to clean, in a sense to be described later, the filtering surface of the filter element, the clearance between the blade edge and the element being selected for proper cleaning action and high filtering rate. Actual contact between the blade and the filter element is to be avoided for the reason to follow.

Clearance between the blades and filter element must be relatively small for proper operation. This clearance will vary somewhat with different types of filtering elements. With an edge type filter element satisfactory results have been obtained, for example, using clearances from about 0.1 inch down to about 0.01 or even lower. In general, in the case of a given type filter element decreased clearances between filter element and blades are accompanied by higher filter-rates and permit use of lower pressures.

These low clearances result in the maintenance of a thin film or layer of wax on the filter element through which oil passes in the filtering operation and which offers relatively low resistance to the oil flow therethrough, as described hereinabove. This thin film is apparently an important factor responsible for the high filtering rate and efficient deoiling characteristics of the process of this invention.

Various types of filter elements or surfaces can be used, but the most satisfactory from the standpoint of efficient operation has been found to be a .003" opening edge-type filter through which the foots oil containing only traces of solid wax is extruded and which gives a high filter-rate at relatively low filtering pressures. Said edge-type filters comprise generally windings of fine wire of approximately triangular cross-section spaced from each other at the bases of the triangles to provide the openings. The filtering surface is that formed by the triangle bases and flow through the filter is through said openings from base to apex, thus affording diverging passages for material which has passed said openings. In this construction filter clogging is minimized.

The operation of the pressure filter with a wax seal of the required depth is desirable for the reasons above set forth. However, it may be observed that this type of operation requires close supervision to prevent the seal from being lost when a change in temperature or slurry consistency occurs. According to the invention, the wax seal is automatically maintained at a constant depth through the employment of a consistency regulator CR for regulating the wax outlet valve DV, the operation of which will generally appear in Fig. 2. As the regulator is the subject matter of an application filed under even date herewith, it will be only generally described here. The regulator includes a vane-like target 10, disposed at the end of a spring loaded lever 11 and located just ahead of the wax seal between the turns of the spiral scraper in the annular wax space adjacent the wax discharge end of the filter. The loading spring is adjusted so that for the proper wax seal the target is deflected by the moving wax to open a pilot air valve PAV controlling the discharge valve DV on the wax outlet. If a change of condition results in the wax in the vicinity of the target becoming softer, loading spring 12 forces the target against the motion of the wax and causes the discharge valve DV to close until the wax has become sufficiently compacted to again deflect the target 10. Hence, the consistency regulator functions to maintain automatically the deoiled wax at the discharge end of the filter at the consistency required to maintain a wax seal of the proper depth and thus overcomes the requirement of manual supervision. It will be understood that the size of the wax outlet opening depends on the filtering pressure and is selected to be as large as possible, with the regulator thereupon controlling the valve opening to establish the proper depth of wax seal.

The size of the oil outlet from the filter element is also selected as to permit free flow of the foots oil extruded through the filter element. Rotation of the filter element within the outer shell acts to agitate the separated foots oil and results in coagulation of the small percentages of the wax extruded through the filtering medium with the foots oil. The foots oil filtrate with the minor percentages of coagulated wax are removed through the oil outlet and delivered to the vibrating screen and there vibrated in known manner to re-gain the wax content thereof.

Some of the factors pertinent to the practice of the process and operation of the filter are discussed separately as follows:

*Type of stock*

In general, numerous test runs indicate that any slack wax which is sweatable can be successfully deoiled according to the present invention, including, for example, slack waxes from predominantly paraffinic crudes such as Pennsylvania crudes and others such as East Texas crudes. Foots oil can be successfully treated by the method of the present invention to regain the small percentages of wax extruded therewith, a refiltration of 96° F. cloud foots oil from a high temperature filtration of East Texas slack yielding 40% of 109° F. melting point wax and 60% of 85° F. cloud foots oil. Sweater plant Pennsylvania foots oil of 91° F. cloud was shown to be filterable to a yield of 18% of 113° F. melting point wax and 82% of 83° F. cloud oil.

Intermediate waxes have also been successfully deoiled according to this invention in runs consisting of refiltrations of the solid product at increased temperature to produce scale waxes of increasing melting points from each successive run. The charge for each refiltration was prepared by heating the scale wax from the preceding run to partially melt the same and produce the proper slurry. Thus, by this procedure refined waxes of desired melting points can be produced which are similar to those obtained from the convential sweating operations.

*Preparation of slurry*

As above indicated, the slurry can be prepared by mixing cold press-cake wax with melted slack wax, or the melted slack wax may be cooled by direct or indirect contact with water or equivalent cooling fluid, or by direct agitation and heating of slack wax. Accordingly, the selection of the preliminary treatment depends upon the specific conditions obtaining in the operating plant. It has been observed that in general the mechanical handling of solid slack wax in cake form has no particular disadvantage since it must be conveyed from the Moore filter presses, in which the slack wax cake is formed, even under the conventional sweater oven procedure. Direct cooling of the melted slack wax by cold water has the disadvantage of requiring a large water supply which, being contaminated with wax and foots oil, is not suitable for boiler feed and would probably require specialized treatment for re-use. Indirect cooling of the slack wax has the advantage of saving water and is probably more adaptable to the cooling of intermediate stocks of relatively small volume requiring accumulation for re-running. In general, the preparation of the slurry by mixing cold press cake with melted slack appears to be preferable for slack wax slurries.

The material resulting from any of the above-described mixing operations, which is termed herein a slurry, is composed of oily agglomerates or curd-like masses of wax having the approximate consistency and appearance of cooked wet rice or oatmeal.

*Filtering Pressure*

Filtering pressure depends upon the type of filter-element. For a given filter element, filter rates increase with the pressure up to the point where excessive quantities of wax are extruded through the filter element with the foots oil. Thus, optimum pressure is that giving maximum filter rate without extrusion of excessive quantities of wax through the filter element with the foots oil. Filtering pressure also varies with the thickness of the wax coating on the filter element as described hereinabove, the thicker coatings requiring higher pressures. Monel screen (30 x 150 mesh) has given good filter rates below 50 lbs. per sq. inch pressure, higher pressures generally extruding excessive amounts of wax through the screen with the foots oil. An edge-type filter element, known as a "Purolator" filter having 0.003" openings, was found to operate satisfactorily at the relatively low pressure of 10 lbs. per sq. inch, a high filtration rate being obtained and no tendency toward plugging being observed. Using the latter filter in deoiling East Texas slack wax with a clearance of 0.01 inch between filter element and spiral blade, pressures as low as 4 lbs. per sq. inch were found satisfactory.

*Temperature*

It is important that while filtering the wax be kept at proper temperature in order that the plastic condition thereof be maintained. This is particularly important during the working or kneading operation in order that the wax particles may properly coalesce or combine under the existing pressure to form the plastic wax seal, referred to hereinabove, at the discharge end of the filter. If too low a filtering temperature is employed, the wax seal will be difficult or impossible to maintain, resulting in blow-by of the slurry and inefficient operation.

Definite minimum filtering temperatures were found to exist for slack wax slurries from different respective stocks below which the required plasticity and efficient filtering was not obtained in particular test runs. These were approximately 90° F. for East Texas and 82° F. for Pennsylvania slack waxes, produced from a conventional Moore pressing operation carried out at 20° F. to produce a 25–30° F. pour effluent (or dewaxed oil), and only slightly lower for the corresponding foots oil. When filtering the latter slack waxes at 79° F., less than half the filter rate at 82 F. was obtained with difficulty in maintaining the wax seal, while at 77° F. the seal could not be maintained at all. Above these minima variation of the filtering temperature affects only the melting points and proportions of the products—filter rates, amounts of wax extruded with the foots oil and general operating characteristics being unaffected. The minimum temperatures are sufficiently low, however, as to produce filtered foots oil with lower wax contents than plant sweated foots oil, thus enabling pressure filtration to at least equal sweating in respect to refined wax yields. Any filtering temperature above the minimum may be employed which is consistent with desired results and satisfactory operation. In this respect the upper temperature limit will be below that at which the particular wax being filtered melts or becomes of such non-plastic character that the wax seal cannot be maintained.

Filter Speed

In general, filter rates increase with increased rotation of the filter element within the filter shell, such rotation functioning in connection with the spiral blade to clean the wax from the filter medium, except for a thin coating. From observed results, the more frequently the medium is cleaned the higher the filter rate. For example, speeds of rotation of 18, 27 and 38 R. P. M. gave filter rates of progressively increasing values.

Successive pressure filtrations of slack at increasing temperatures, according to this invention, produce refined wax of excellent quality, in comparison with wax obtained by successive sweats of the same slack. Accordingly the present process can, if desired, be used to entirely replace wax sweating. Based on an experimental filtration rate of 35 gals of slack wax per sq. ft. per hr. and quality of wax produced, 75 sq. ft. of filtering surface is equivalent to 500 barrels of sweating capacity.

The present process may be used advantageously in supplement of sweating by pressure-filtering slack wax and thereupon sweating the filtered wax product.

The following tabulated data showing typically representative operating conditions and results from runs of Pennsylvania and East Texas slack waxes which were treated in accordance with the foregoing in a filter having 1.2 sq. ft. filtering area will further serve to illustrate the invention.

|  | Stock run | |
| --- | --- | --- |
|  | Pa. slack | E. T. slack |
| Filter medium | .003" edge | Filter |
| Filtering pressure, lbs. per sq. in. | 12 | 5 |
| Filtering temperature, °F | 83 | 90 |
| Filter rate, gals. charge/sq. ft./hr | 43 | 47 |
| Product yields in percent: |  |  |
| Percent filtered scale wax | 61 | 49 |
| Percent wax extruded with foots | 1.8 | 5.8 |
| Melting points in °F.: |  |  |
| Charge | 103.4 | 109.2 |
| Filtered scale wax | 111.3 | 120.0 |
| Wax extruded with foots | 109.8 | 111.2 |
| Foots oil cloud | 84 | 93 |

It will be understood that the operating conditions and results tabulated hereinabove are merely illustrative and that other conditions and results may obtain in other instances. Also, it should be noted that the runs set forth in the table are single filtrations and that subsequent filtrations of the products resulting therefrom would produce deoiled waxes of different characteristics.

I claim:

1. A continuous process for deoiling wax which comprises continuously supplying a flowable stream of a wax-oil slurry under pressure to a filtering surface, propelling the slurry along said filtering surface in a confined channel while progressively filtering oil therefrom to separate a semi-solid wax and while progressively compacting the separated wax to form a seal of deoiled wax at the end of said channel, and continuously removing deoiled wax from said seal at a rate substantially equal to its rate of formation.

2. A continuous process for separating wax from a mixture of oil and wax particles, comprising continuously supplying the mixture to a filter element, filtering a substantial proportion of the oil from the mixture and, while maintaining the resulting partially deoiled wax under pressure and at a temperature at which the particles will agglomerate, subjecting it to a progressive filtering and compacting operation in contact with a continuously cleaned filter element to separate a further amount of oil therefrom and produce a continuous mass of deoiled wax.

3. A continuous process for separating wax from an oily mixture containing solid wax particles, which consists in continuously filtering a flowable stream of the mixture at a pressure selected for optimum rate of filtering and at a temperature causing the wax particles to agglomerate and to filter out as a plastic wax product, and simultaneously filtering and working the wax product along a filtering surface to discharge while progressively compacting the same to a controlled consistency and adjusting the consistency of the compacted wax passing to discharge to that required to prevent channeling and blowby of the wax through said path.

4. A continuous process for separating wax from a wax-oil slurry, which consists in continuously supplying a flowable stream of the slurry to the inlet end of a pressure filter provided with a filter element through which the oil is extruded and with an elongated passage for the wax particles which agglomerate under pressure and filter out as a plastic wax product, propelling the wax product along the length of the passage to the discharge end thereof, and adjusting the consistency of the wax in the region of said discharge end to that required to form a substantially solid wax seal against which the wax is worked and progressively compacted as it is propelled through said passage.

5. A continuous process for separating wax from a wax-oil slurry, which consists in continuously supplying a flowable stream of the slurry to the inlet end of a pressure filter provided with a filter element through which the oil is extruded and with an elongated passage for the wax particles which agglomerate under pressure and filter out as a plastic wax product, continuously removing wax from the filter element and extruding the wax product through a discharge opening located at the discharge end of said passage and of size such that the wax in the region of the discharge end of the passage is compacted to form a substantially solid wax seal.

6. A continuous process for separating wax from a wax-oil slurry, which consists in continuously supplying a flowable stream of the slurry under pressure to the inlet end of a pressure filter provided with a filter element through which the oil is extruded and with an elongated passage for the wax particles which agglomerate under pressure and filter out as a plastic wax product, extruding the wax product through an opening at the discharge end of the passage, and regulating the size of said opening in accordance with the consistency of said wax in the region of the discharge end of the passage.

7. A process according to claim 2, wherein the oil filtrate is recycled through the process with a stream of the oil-wax mixture.

8. A process according to claim 2, wherein the wax separated from the mixture is sweated to further refine the same.

9. In apparatus of the character described, the combination of means for forming a wax-oil slurry, an extrusion filter including a filtering medium through which the oil is extruded and means for continuously propelling the wax filtering out on said medium along the length thereof, means for continuously introducing the slurry to the inlet end of the filter at a pressure such as to cause the wax particles to agglomerate and to filter out as a plastic wax product and for continuously and separately discharging the wax product and the oil filtrate from the other end of the filter, and means for progressively compacting the plastic wax product as it is propelled through the filter to a selected consistency such that the compacted wax forms a solid wax seal at the discharge end of the filter which prevents channeling of the initially plastic wax product.

10. In apparatus of the character described, the combination of means for forming a wax-oil slurry, an extrusion filter including a filtering medium through which the oil is extruded and means for continuously propelling the wax filtering out on said medium along the length thereof, means for continuously introducing the slurry to the inlet end of the filter at a pressure such as to cause the wax particles to agglomerate and to filter out as a plastic wax product and for continuously discharging the wax and oil filtrates from the other end of the filter, means for progressively compacting the plastic wax product as it is propelled through the filter whereby the compacted wax forms a solid wax seal at the discharge end of the filter to prevent channeling of the initially plastic wax product therethrough, and means for regulating the consistency of the compacted wax forming said seal.

11. A process as defined in claim 2 in which the stated filter element comprises filtering passages which increase in size in the direction of flow of the oil therethrough.

12. Apparatus as specified in claim 9 in which the filtering medium is of the edge-type comprising elements diverging in the direction of flow of the oil between them.

13. A pressure filter for filtering a wax-oil slurry comprising a filtering medium through which the oil is extruded and means for continuously propelling the wax filtering out on said medium along the length thereof, means for continuously introducing the slurry to the inlet end of the filter at a pressure such as to cause the wax particles to agglomerate and to filter out as a plastic wax product and for continuously and separately discharging the wax product and the oil filtrate, and means for progressively compacting the plastic wax product as it is propelled through the filter to a selected consistency such that the compacted wax forms a solid wax seal at the discharge end of the filter which prevents channeling of the initially plastic wax product.

ADAM H. GEBAUER.